US011097788B2

United States Patent
Perlo et al.

(10) Patent No.: US 11,097,788 B2
(45) Date of Patent: Aug. 24, 2021

(54) ELECTRIC VEHICLE WITH SEGMENTED FRAME AND AUXILIARY FRAME IN LATTICE STRUCTURE

(71) Applicants: Interactive Fully Electrical Vehicles SRL, Sommariva del Bosco (IT); Poli-Model S.R.L., La Loggia (IT)

(72) Inventors: Pietro Perlo, La Loggia (IT); Pietro Guerrieri, Moncalieri (IT); Marco Biasiotto, Turin (IT); Davide Penserini, Florence (IT)

(73) Assignee: Interactive fully Electrical Vehicles S.R.L., Sommariva del Bosco (IT)

( * ) Notice: Subject to any disclaimer, the term of this patent is extended or adjusted under 35 U.S.C. 154(b) by 396 days.

(21) Appl. No.: 16/340,003

(22) PCT Filed: Oct. 6, 2017

(86) PCT No.: PCT/IB2017/056175
§ 371 (c)(1),
(2) Date: Apr. 5, 2019

(87) PCT Pub. No.: WO2018/065946
PCT Pub. Date: Apr. 12, 2018

(65) Prior Publication Data
US 2020/0031405 A1 Jan. 30, 2020

(30) Foreign Application Priority Data
Oct. 7, 2016 (IT) .................. 102016000101007

(51) Int. Cl.
*B60K 8/00* (2006.01)
*B62D 27/02* (2006.01)
(Continued)

(52) U.S. Cl.
CPC .............. *B62D 27/023* (2013.01); *B60K 8/00* (2013.01); *B60L 50/50* (2019.02); *B62D 7/163* (2013.01); *B62D 21/155* (2013.01)

(58) Field of Classification Search
CPC ...... B62D 27/023; B62D 27/02; B62D 27/00; B62D 7/163; B62D 7/16; B62D 7/00;
(Continued)

(56) References Cited

U.S. PATENT DOCUMENTS 5,280,957 A * 1/1994 Hentschel ................ B60G 3/20
280/124.109
6,843,524 B2 * 1/2005 Kitagawa ............. B62D 21/155
180/312

(Continued)

FOREIGN PATENT DOCUMENTS

JP 08-206741 A 8/1996
WO 2002/38434 A2 5/2002
(Continued)

OTHER PUBLICATIONS

International Search Report and Written Opinion dated Jan. 26, 2018, issued in PCT Application No. PCT/IB2017/056175, filed Oct. 6, 2017.

*Primary Examiner* — James M Dolak
(74) *Attorney, Agent, or Firm* — Workman Nydegger

(57) ABSTRACT

An electric-propulsion car includes: a main frame, a front axle unit, a rear axle unit, wherein the axle units each have an auxiliary frame for supporting the axle units and two suspension units that connect two respective wheel supports to the supporting auxiliary frame, wherein at least one of the axle units is a motorized axle with steering wheels including, mounted on said auxiliary frame, an electric motor for actuating the rotation of the wheels, a control unit for controlling said electric motor, a transmission unit for connecting the electric motor to the wheels, and a steering
(Continued)

device for steering the wheel supports, and wherein each one of the main frame and auxiliary frames includes a reticular lattice structure including boxed elements made of steel, each one of the main frame and auxiliary frames being adapted to be pre-assembled separately and then assembled together. The main frame and auxiliary frames include elements made up of multiple segments connected together and derived from at least one boxed element made of high-tensile steel, wherein the at least one boxed element has at least one notch formed on at least one side of the boxed element without involving an ulterior side of the boxed element, the notch being made on the at least one side at the point where said ulterior side of the boxed element has to be bent to obtain the configuration of the finished boxed element.

17 Claims, 11 Drawing Sheets

(51) Int. Cl.
   *B60L 50/50* (2019.01)
   *B62D 7/16* (2006.01)
   *B62D 21/15* (2006.01)

(58) Field of Classification Search
   CPC ...... B62D 21/155; B62D 21/11; B62D 21/00; B62D 21/152; B62D 21/02; B62D 21/08; B62D 23/005; B62D 23/00; B62D 25/00; B62D 25/082; B62D 25/08; B60L 50/50; B60L 50/00; B60K 8/00; B60K 1/00; B60K 2001/001
   See application file for complete search history.

(56) References Cited

U.S. PATENT DOCUMENTS

| | | | | |
|---|---|---|---|---|
| 7,097,235 | B2* | 8/2006 | Yasukouchi | B62D 21/152 296/187.03 |
| 7,121,586 | B2* | 10/2006 | McNally | B62D 21/02 280/797 |
| 7,185,945 | B2* | 3/2007 | Dandekar | B62D 21/152 296/187.09 |
| 8,398,152 | B1* | 3/2013 | Mazur | B62D 21/152 296/187.09 |
| 8,596,711 | B2* | 12/2013 | Yasui | B62D 25/082 296/187.09 |
| 9,145,170 | B2* | 9/2015 | Mori | F16F 7/12 |
| 9,567,013 | B2* | 2/2017 | Ehrlich | B60R 13/08 |
| 9,701,344 | B2* | 7/2017 | Kodama | B62D 21/152 |
| 10,160,301 | B2* | 12/2018 | Perlo | B62D 21/11 |
| 10,518,811 | B2* | 12/2019 | Harpster | B62D 25/08 |
| 10,913,417 | B2* | 2/2021 | Newcomb | B62D 25/08 |
| 2012/0248820 | A1 | 10/2012 | Yasui et al. | |

FOREIGN PATENT DOCUMENTS

| | | |
|---|---|---|
| WO | 2016/055873 A1 | 4/2016 |
| WO | 2016/055874 A1 | 4/2016 |

* cited by examiner

ELECTRIC VEHICLE WITH SEGMENTED FRAME AND AUXILIARY FRAME IN LATTICE STRUCTURE

BACKGROUND OF THE INVENTION

1. The Field of the Invention

The present invention relates to the field of frames for electric-propulsion cars, with particular reference to the "city car" (or "kei car", a new term introduced in Japan) category for passenger transport, as well as to the so-called "minivan" category, also electrically driven, for freight transport.

2. The Relevant Technology

More in particular, the invention relates in general to an electric-propulsion vehicle of the type comprising:
a main frame,
a front axle unit,
a rear axle unit,
wherein said axle units comprise each an auxiliary frame for supporting said axle units and two suspension units that connect two respective wheel supports to said supporting auxiliary frame,
wherein at least one of said axle units is a motorized axle with steering wheels comprising, mounted on said auxiliary frame, an electric motor for actuating the rotation of the wheels, a control unit for controlling said motor, a transmission unit for connecting the electric motor to the wheels, and a steering device for steering the wheel supports,
and wherein each one of said main frame and auxiliary frames comprises a reticular lattice structure including boxed elements made of steel, each one of said main frame and auxiliary frames being adapted to be pre-assembled separately and then assembled together.

By way of example, an electric car having the above-mentioned features has been proposed in prior Italian patent applications No. TO2014A0000035, No. TO2014A0000305 and No. TO2014A0000804 in the name of the present Applicant.

In known cars, the boxed steel elements of the main frame and of the auxiliary frames are bent, typically by using a technique known as "stretch and bending", in order to give them the desired shape; then they are welded in order to pre-assemble each one of said main frame and auxiliary frames.

It is however clear that the steps of bending and welding the boxed steel elements of the frame result in time-consuming and costly production processes and equipment required for the integration of such elements into the general frame structure.

Moreover, such steps prevent the attainment of good production flexibility, in that the different bends of the boxed steel elements can only be obtained by using specially shaped moulds, which are substantially different for each part and which necessarily require high precision to ensure that the different elements will match together perfectly, so as to facilitate the next welding operations. With conventional bending and welding technologies, the reference moulds must be very accurate and also highly sensorized to ensure that all components are properly in contact prior to welding.

SUMMARY OF THE INVENTION

In this context, it is the main object of the present invention to provide an electric-propulsion car and a related manufacturing method which can overcome the drawbacks of the prior art.

In particular, it is one object of the present invention to provide a car of the above-mentioned type, the structural architecture of which allows a drastic simplification of the production processes and equipment, resulting in lower installation costs compared to blank pressing technologies, including the so-called "tailored blank" solutions, thus proving economically advantageous for small-scale and large-scale production.

It is another object of the invention to provide a car comprising a frame that can be assembled by carrying out very simple operations in very short production times.

Another important object of the present invention is to provide a car having a structural architecture that ensures high production flexibility, since it allows the production of different car versions or models through simple and economical adaptations of the components and production equipment.

It is a further object of the invention to achieve all of the above-mentioned goals through a car structure that ensures, in the event of a collision, characteristics of strength and passenger safety that significantly outperform those normally attainable by cars belonging to the same category.

It is a further object of the invention to provide a car structure that ensures sufficient shock-proof storage space for the electric batteries of the electric drive motor(s) aboard the vehicle.

It is yet another object to provide a car structure in which the wheel track can be widened or lengthened by replacing a few elements of the main and auxiliary frames.

Such objects are achieved by the present invention through an electric-propulsion car and a related manufacturing method incorporating the features set out in the appended claims, which are an integral part of the present description.

BRIEF DESCRIPTION OF THE DRAWINGS

Further objects, features and advantages of the present invention will become apparent from the following detailed description and from the annexed drawings, which are supplied by way of non-limiting explanatory example, wherein.

DETAILED DESCRIPTION OF THE PREFERRED EMBODIMENTS

Figure 1:
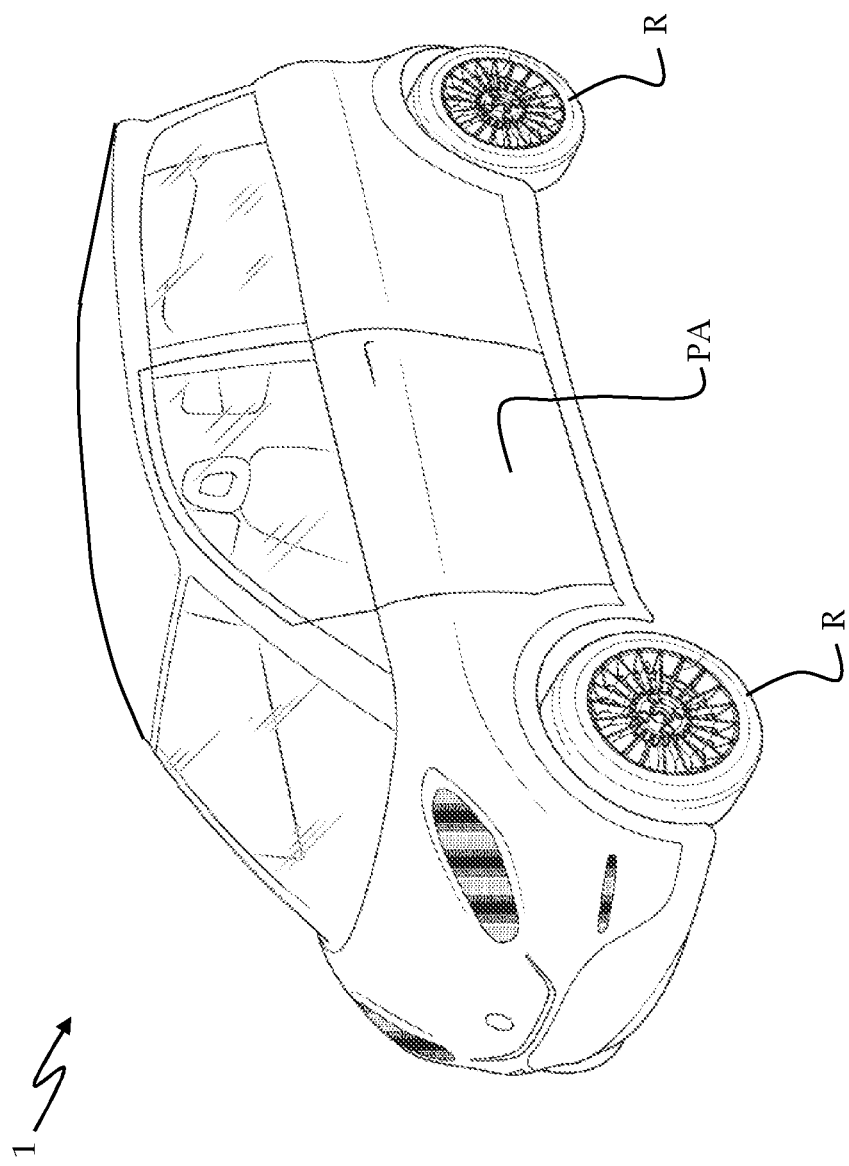
FIG. 1 is an illustrative perspective view of an electric-propulsion car according to the present invention.

In FIG. 1, reference numeral 1 designates an electric-propulsion car of the "city car" (or "kei car", a new term introduced in Japan) category for passenger transport, to which the principles at the basis of the present invention can, for example, be applied; it is however clear that such principles are also applicable to an electric-propulsion vehicle belonging to the so-called "minivan" category, also electrically driven, for freight transport.

In the case wherein the car 1 is of the type intended for passenger transport (like the one shown in FIG. 1, wherein the car 1 has a length of approx. 3.0 meters and a width of approx. 1.48 meters), it preferably has a single front side door on one side of the car 1, a lower door on the opposite front side, and a wider rear side door on the opposite side of the car 1, the so-called B pillars being asymmetrical. The lower door on the right-hand front side, since it is used less often, is narrower and is essentially a safety feature that provides a way out for the driver should the car 1 overturn. The use of the front door on the right-hand side is optional, since the rear door on the right-hand side can also be used as a way out.

In the example shown in FIG. 1, the only front side door, designated as PA, is situated on the left-hand side of the car 1, whereas the only rear side door (not shown in FIG. 1) is situated on the right-hand side.

Thanks to this arrangement, both the front door PA and the rear door can have a dimension in the longitudinal direction of the car 1 which is significantly longer than that which would be possible if both doors were located on the same side of the car 1. In other words, with the above-described arrangement both the front door PA and the rear door have a relatively long dimension in the longitudinal direction, compared to the total longitudinal dimension of the car 1, which allows easy access to the driver seat and to the rear seats in spite of the very short longitudinal dimension of the car 1.

Furthermore, photovoltaic cells may be provided on the roof and/or on other portions of the car 1 (such cells are not shown in FIG. 1 because they are per se known).

Figure 2:
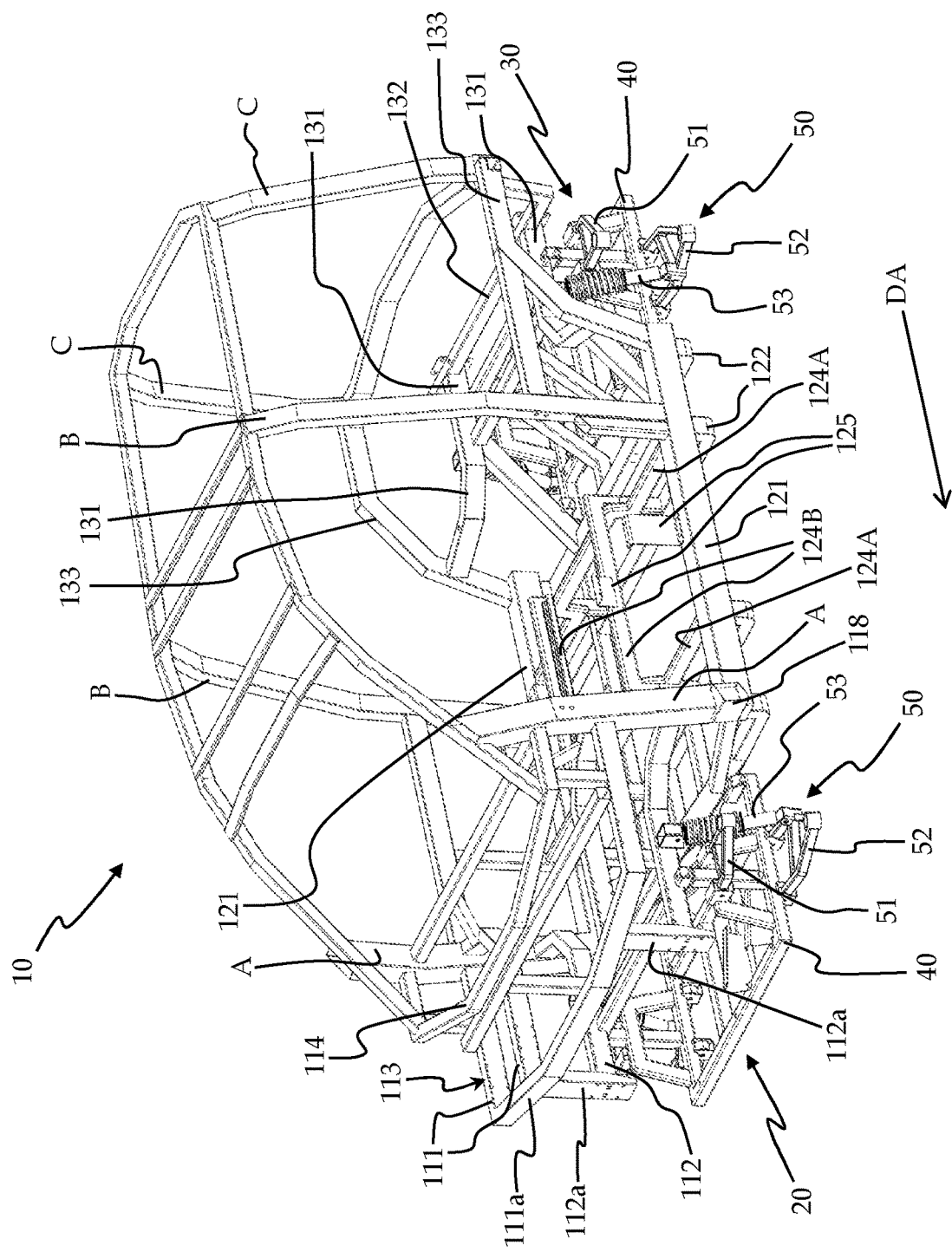
FIG. 2 is a perspective view of the frame of the car according to the present invention.

FIG. 2 shows an example of embodiment of the frame of the car 1 according to the present invention.

In this drawing, it can be noticed that the car 1 comprises:
a main frame 10,
a front axle unit 20,
a rear axle unit 30,
wherein said axle units 20, 30 comprise each an auxiliary frame 40.

Figure 3:
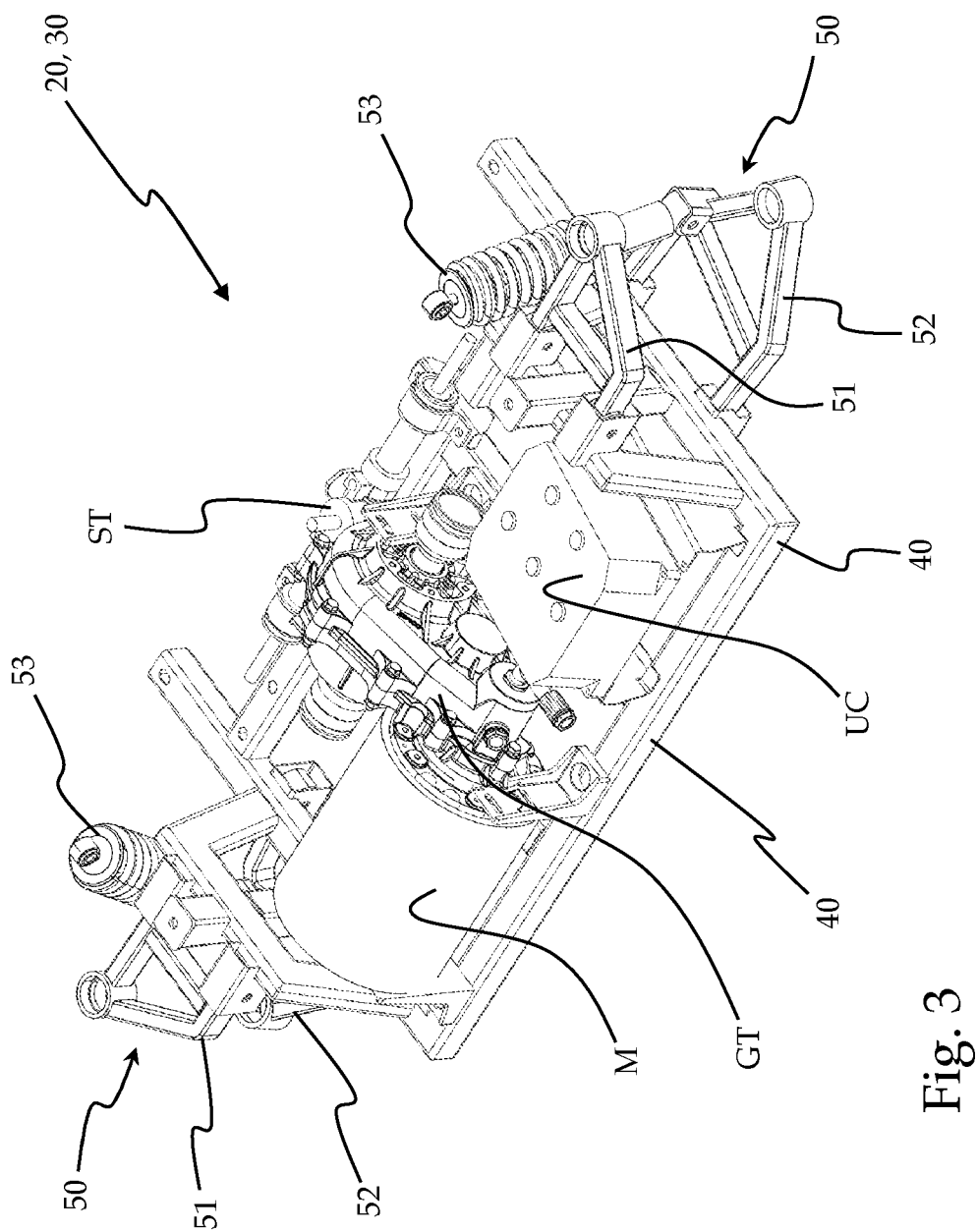
FIG. 3 is a perspective view of an auxiliary frame of the car according to the present invention.

FIG. 3 is a perspective view of the auxiliary frame 40 of the car 1 according to the present invention.

In this drawing it can be noticed that each auxiliary frame 40 can support an axle unit 20, 30, each axle unit 20, 30 comprising two suspension units (designated as a whole by reference numeral 50 in the annexed drawings), which connect two respective wheel supports (not shown in the drawings) to said supporting auxiliary frame 40.

Preferably, the front axle unit 20 and the rear axle unit 30 are shaped like the one shown in the example of FIG. 3, which refers to a solution wherein each axle unit 20, 30 comprises an electric motor M for actuating the rotation of the wheels R, a control unit UC for the electric motor M, and a transmission unit GT including a differential gear for connecting the electric motor M to the wheels R of the car 1.

Moreover, the front axle unit 20 and the rear axle unit 30 preferably have steering wheels R, and therefore comprise a steering device S for controlling the steering of the wheels R.

As a consequence, in a preferred embodiment the front axle unit 20 and the rear axle unit 30 are substantially identical (save for the fact that one is turned by 180° relative to the orientation of the other), thus making the production of the car 1 simpler and more economical.

It must however be pointed out that the present invention is also applicable to a car 1 wherein the electric motor M and/or the respective control unit E and/or transmission unit T and/or steering device S are only associated with one of the two axle units, the other axle unit only carrying the two respective suspension units 50.

Furthermore, each one of said main frame 10 and auxiliary frames 40 are adapted to be pre-assembled separately and then assembled together; in particular, the auxiliary frames 40 whereon the parts of the front axle unit 20 and rear axle unit 30 are pre-assembled are in turn secured through fastening means to the main frame 10 of the car 1, e.g., by means of bolts (preferably only two fastening points per auxiliary frame 40).

FIG. 3 also shows that said auxiliary frames 40 are adapted to carry suspension units of the McPherson or articulated quadrilateral type; each entire suspension unit 50 can be pre-assembled on the auxiliary frame 40 and then mounted together with the latter on the main frame 10 at a subsequent stage.

In particular, each wheel R is rotatably mounted on a wheel support (not visible in the drawings), which is pivotally mounted to the respective auxiliary frame 40 through a suspension unit 50 that includes an upper control arm 51 and a lower control arm 52. Each control arm 51, 52 has a substantially triangular configuration, with one end connected in an articulated manner to the auxiliary frame 40 through elastic supports, and the opposite end pivotally connected to the wheel support.

With each wheel R also a shock absorber unit of the cylinder-coil spring type is associated, designated as a whole as 53. In particular, each shock absorber unit 53 is connected to the lower arm 52 on each side of each axle unit 20, 30; this provision is particularly advantageous (especially as concerns the rear axle unit 30) because it allows locating the upper end of each shock absorber unit 53 at a relatively low level in the vertical direction, resulting in more room available inside the passenger compartment of the car 1.

A further advantageous feature of the preferred embodiment of the car 1 is that the upper control arms 51 of the rear axle unit 30 have such a configuration that the end of each upper control arm 51 that is connected to the respective auxiliary frame 40 is longitudinally displaced relative to the outer end of the upper control arm 51 that is connected to the respective wheel support. This result is attained by using an upper control arm 51 having a considerably curved plan-view configuration. In the rear axle unit 30, the outer end of each arm 51 is longitudinally displaced forwards (with reference to the direction of travel of the car 1, indicated as DA in FIG. 2), whereas in the front axle unit 20 the outer end of each arm 51 is longitudinally displaced backwards (still with reference to the direction of travel DA of the car 1). Thanks to such a configuration, the shock absorber unit 53 of the cylinder-coil spring type associated with each upper control arm 51 of the rear axle unit 30 can be positioned in such a way as to clear some space in the passenger compartment, particularly in the region of the rear seats of the car 1. Therefore, due to this configuration of the rear axle unit 30, the rear seats of the car 1 according to the present invention can be positioned in such a way as to significantly increase the room available to the passengers in the transverse direction.

According to one important feature of the present invention, each one of said main frame 10 and auxiliary frames 40 has a reticular lattice structure including arms consisting of boxed elements 60.

In accordance with the present invention, said main frame 10 and auxiliary frames 40 comprise elements made up of multiple segments connected together and derived from at least one boxed element 60 made of high-tensile steel.

In a preferred embodiment, said at least one boxed element 60 is made of Dual-Phase (DP) steel, in particular of the DP600, DP800, DP1000 and DP1200 types. The main frame is therefore made up of a mixture of boxed elements made of dual-phase high-tensile steel providing lightness and at the same time the strength necessary to exceed the most stringent "crash test" requirements.

Dual-phase steel consists of a ferrite matrix in which a volumetric fraction of martensite is evenly dispersed; ferrite gives excellent ductility to steel, while martensite is the hard phase, capable of ensuring high strength. When dual-phase steel is processed, the strain concentrates in the ferrite, thus causing high hardening by deformation. This mechanism combines with very good elongation characteristics to give these steels a low Re/Rm ratio, and hence a higher breaking load than conventional steels characterized by a similar yield limit. Furthermore, higher strength can also be attained following heat treatments such as painting.

Figure 4A:
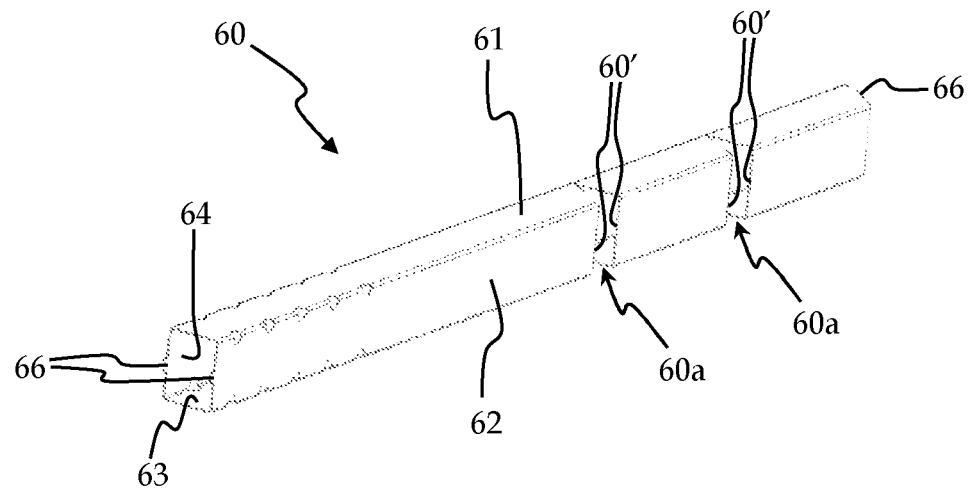
FIGS. 4a and 4b are different perspective views of a first embodiment of a boxed element used in the frame of the car according to the present invention.
Figure 5A:
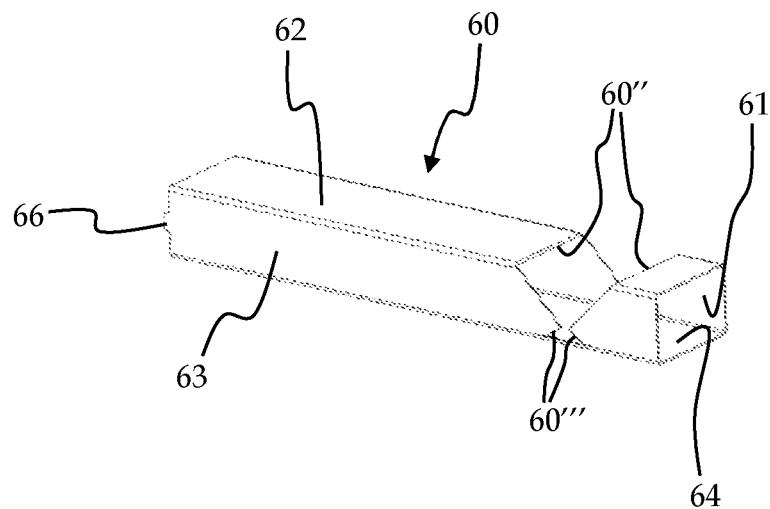
FIGS. 5a and 5b are different perspective views of a second embodiment of a boxed element used in the frame of the car according to the present invention.

In addition, according to the present invention said at least one boxed element 60 comprises at least one notch (see the notches designated as 60a, 60b in FIGS. 4a and 5a) formed on at least one side 61, 62, 63 of said boxed element 60 without involving an ulterior side 64 of the boxed element 60, said notch 60a, 60b being made on said at least one side 61, 62, 63 at the point where said ulterior side 64 has to be bent to obtain the configuration of the finished boxed element 60.

In the exemplary embodiments shown in FIGS. 4a to 5b, said at least one boxed element 60 has a quadrilateral cross-section, in particular a rectangular or square shape, and comprises at least one notch 60a, 60b realized on three sides 61, 62, 63 of said quadrilateral (rectangle or square) without involving a fourth side 64 of the boxed element 60, said notch 60A, 60B being made at the point where said fourth side 64 of the boxed element 60 has to be bent to obtain the configuration of the finished boxed element 60.

The solutions proposed herein are of course also applicable to high-tensile sheet-steel boxed elements having a complex cross-section, such as an "L", "T" or "Z" cross-section, e.g., suitable for facilitating the coupling between the frame of the car 1 and metal, plastic or composite panels.

In particular, in the case wherein said at least one boxed element 60 has an "L" or "T" cross-section (such an embodiment is not shown in the annexed drawings), said notch 60a, 60b is made on a first side of the boxed element 60 without involving an ulterior (second) side of the boxed element 60, said notch 60a, 60b being realized on the first side of the boxed element 60 at the point where the ulterior (second) side has to be bent to obtain the configuration of the finished boxed element 60.

Furthermore, in the case wherein said at least one boxed element 60 has a "Z" cross-section (this embodiment is also not shown in the annexed drawings), said notch 60a, 60b is made on a first and a second side of the boxed element 60 without involving an ulterior (third) side of the boxed element 60, said notch 60a, 60b being realized on the first and second sides of the boxed element 60 at the point where the ulterior (third) side has to be bent to obtain the configuration of the finished boxed element 60.

It should be noted that, in accordance with the present invention, the notches 60a, 60b may be of different types to facilitate the bending and welding of the junction. In particular, the cut may not be linear, for the purpose of lengthening the welding of the junction and stopping any welding cracks.

Figure 4B:
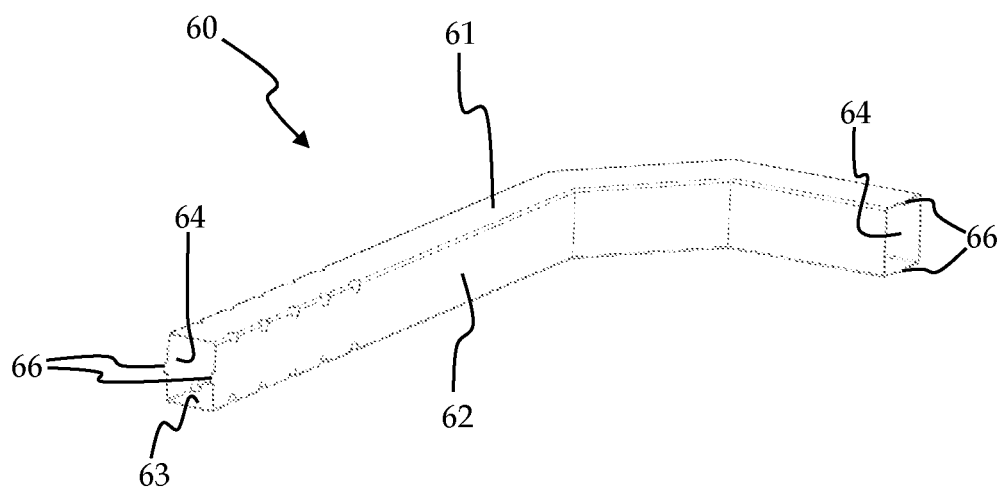

A first exemplary notch (designated as 60a in FIG. 4a) has a substantially triangular shape (i.e., it is shaped substantially like a "V" in a side view of the boxed element 60) and defines at least one first pair 60' of surfaces facing each other on said at least one side 61, 62, 63 of the boxed element 60 to allow making sharp bends on said ulterior side 64 of the boxed element 60 (said sharp bends can be observed in FIG. 4b).

Said first example of a notch 60a is used for "stitched" segments, "zigzag" segments or curvilinear tracts suitable for lengthening the weld.

For example, in the case wherein said at least one boxed element 60 has a quadrilateral cross-section, in particular a rectangular or square shape (as in the exemplary embodiment shown in FIGS. 4a to 5b), the notch 60a having a substantially triangular shape defines first pairs 60' of surfaces facing each other on three sides 61, 62, 63 of the boxed element 60 for making sharp bends on the fourth side 64 of said boxed element 60.

Instead, if the boxed element 60 has an "L" or "T" cross-section, said substantially triangular first notch 60a defines a first pair 60' of surfaces facing each other on a first side of the boxed element 60 for making a sharp bend on an ulterior (second) side of the boxed element 60.

When the boxed element 60 has a "Z" cross-section, said substantially triangular first notch 60a defines first pairs 60' of surfaces facing each other on a first and a second side of the boxed element 60 for making a sharp bend on an ulterior (third) side of the boxed element 60.

Figure 5B:
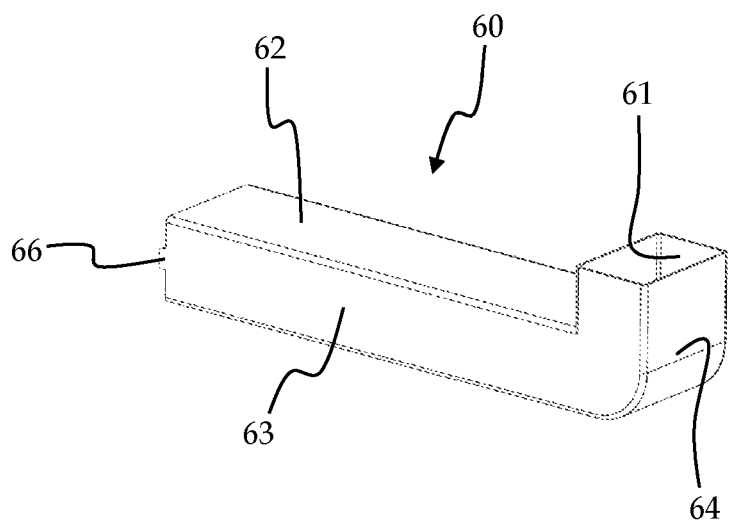

A second exemplary notch (designated as 60b in FIG. 5a) has substantially an "X" shape (in this case as well, in a side view of the boxed element 60) and defines at least one second pair 60'' of surfaces facing each other on said at least one side 61, 62, 63 of the boxed element 60 and at least one third pair 60''' of radiused contact surfaces formed on a portion of said at least one side 61, 62, 63, facing towards said ulterior side 64 of the boxed element 60, wherein said second notch 60b allows making a radiused bend on said ulterior side 64 of said boxed element 60 (note that said radiused bend on the ulterior side 64 is visible in FIG. 5b).

For example, in the case wherein said at least one boxed element 60 has a quadrilateral cross-section, in particular a rectangular or square shape (as in the exemplary embodiment shown in FIGS. 4a to 5b), the second notch 60b defines:

second pairs 60'' of surfaces facing each other on three sides 61, 62, 63 of the boxed element 60, third pairs 60''' of radiused contact surfaces formed on a portion of a first side 61 and a third side 63, facing towards the fourth side 64 of the boxed element 60, in particular said first side 61 and third side 63 being the contiguous sides that face towards said fourth side 64, said second notch 60b allowing a radiused bend to be made on the fourth side 64 of said boxed element 60.

Instead, if the boxed element 60 has an "L" or "T" cross-section, said second notch 60b defines a second pair 60'' of surfaces facing each other and a third pair 60''' of contact surfaces on a first side of the boxed element 60 for making a radiused bend on an ulterior (second) side of said boxed element 60.

When the boxed element 60 has a "Z" cross-section, said second notch 60b defines the second pairs 60'' of surfaces facing each other and the third pairs 60''' of contact surfaces on a first and a second side of the boxed element 60 for making a radiused bend on an ulterior (third) side of said boxed element 60.

It is therefore clear that said first exemplary notch 60a and second exemplary notch 60b extend on at least one side (in particular, a first side 61, a second side 62 and a third side 63, when the boxed element 60 has a quadrilateral cross-section), but do not involve an ulterior side (in particular, a fourth side 64, when the boxed element has a quadrilateral cross-section) of said boxed element 60, which will thus remain without any discontinuity; as a consequence, the boxed element 60 can be easily shaped by bending said ulterior side 64 of said boxed element 60, in particular said bending being effected along hinge lines formed on said ulterior side 64 at the notches 60a, 60b.

Furthermore, the size of the angle at the vertex of each notch 60a, 60b is substantially equal to the angle of bending required for the boxed element 60; it is therefore apparent that the bending of the boxed element 60 can be effected through notches 60a, 60b having different bending angles, so as to obtain a boxed element 60 shaped with different profiles.

It should be noted that the notches 60a, 60b are preferably made by subjecting the boxed element 60 to laser cutting.

Once all necessary notches 60a, 60b have been made in suitable positions and the boxed element 60 has been bent, the pairs 60', 60'', 60''' of surfaces defined by the notches 60a, 60b are connected together by welding. The notches 60a, 60b proposed herein for facilitating the bending of the elements can, of course, be implemented also for high-strength sheet-steel elements having complex shapes, e.g., "Z", "L" or "T" shapes, which can in turn facilitate the coupling between the frame of the car 1 and metal, plastic or composite panels.

Figure 6:
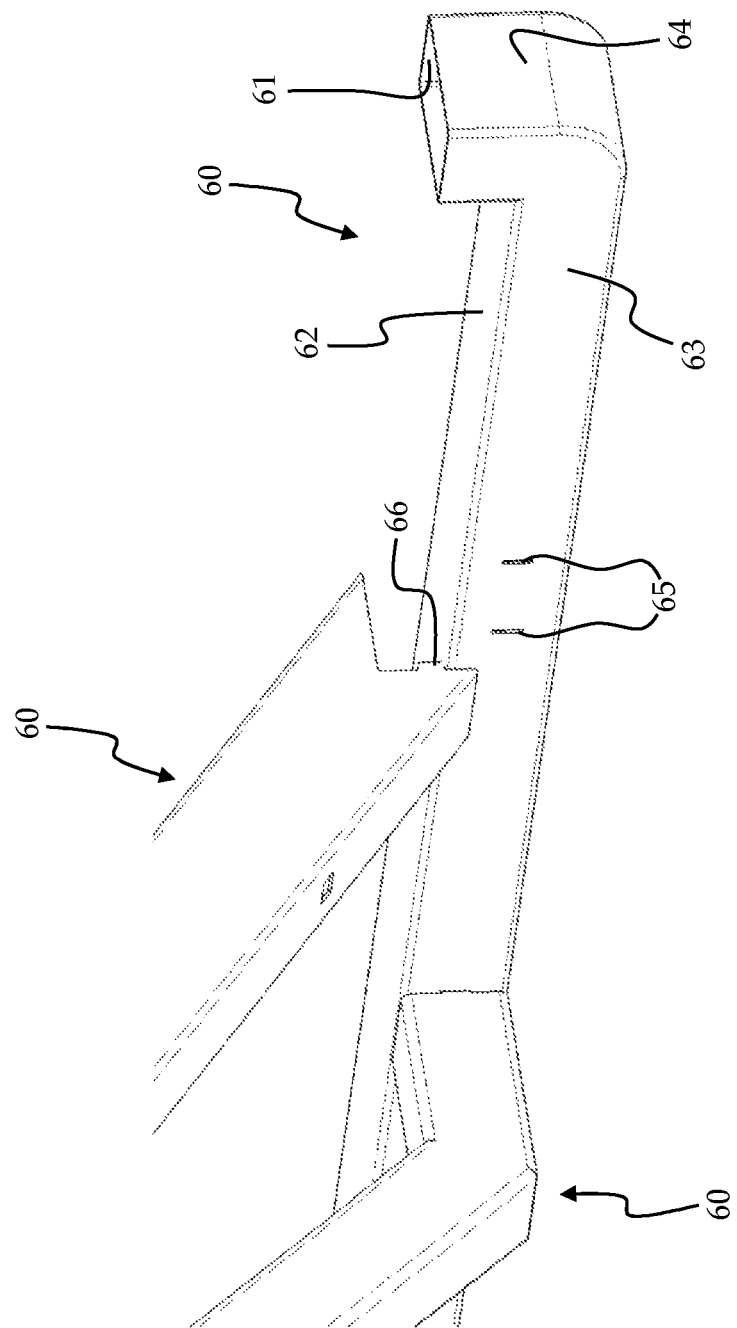
FIG. 6 is a perspective view of some details of a boxed element used in the frame of the car according to the present invention.

FIG. 6 also shows that the boxed element 60 is preferably so realized as to comprise positioning means 65, 66 adapted to define a univocal coupling between said boxed element 60 and another boxed element 60 and/or another component of the car 1 according to the present invention.

In a preferred embodiment, said positioning means 65, 66 comprise at least one seat 65 adapted to receive a corresponding tang 66, in particular the seat 65 and the tang 66 being obtained by subjecting the boxed element 60 to a laser cutting operation.

Preferably, each boxed element 60 has seats 65 and/or tangs 66 that univocally define the mutual positioning.

These provisions are useful to simplify the process of assembling the main frame 10 and the auxiliary frames 40 of the car 1, as well as the equipment necessary for effecting said assembly process; for example, such provisions allow avoiding the use of special welding masks.

It is clear that, following said univocal coupling of the positioning means 65, 66 of the boxed element 60, the final fixing of said boxed element 60 to another boxed element 60 and/or to other components of the car 1 is preferably effected by welding.

Note also that the shape of the seats 65 and tangs 66 may be diversified among the different components, and the connection may be effected as a snap coupling, e.g., by designing the tangs 66 to include elastic tabs (not shown in the annexed drawings); de facto, this avoids the necessity of tack welding the components prior to full welding.

Moreover, as can be seen in FIG. 6, the shape of the terminal tract of a boxed element 60 may be complementary to a portion of another boxed element 60 and/or of another component of the car 1 to which it must be coupled.

The peculiar provisions of the boxed element 60 according to the present invention allow realizing a car 1 having a structural architecture that drastically simplifies the production processes and equipment, resulting in lower installation costs, so as to make even a small-scale or small-series production economically advantageous.

In fact, such provisions allow manufacturing the main frame 10 and the auxiliary frames 40 with a minimal number of parts, all derived from laser-cut high-strength boxed elements, by executing extremely simple steps in very short production times.

Furthermore, the provisions of the present invention allow attaining high production flexibility, since different versions or models of a car can be manufactured through simple and low-cost adaptations of the boxed elements 60 and also of the production fixtures, since it will be sufficient to use laser cutting machines to produce the boxed elements 60 in accordance with the teachings of the present invention.

Figure 7:
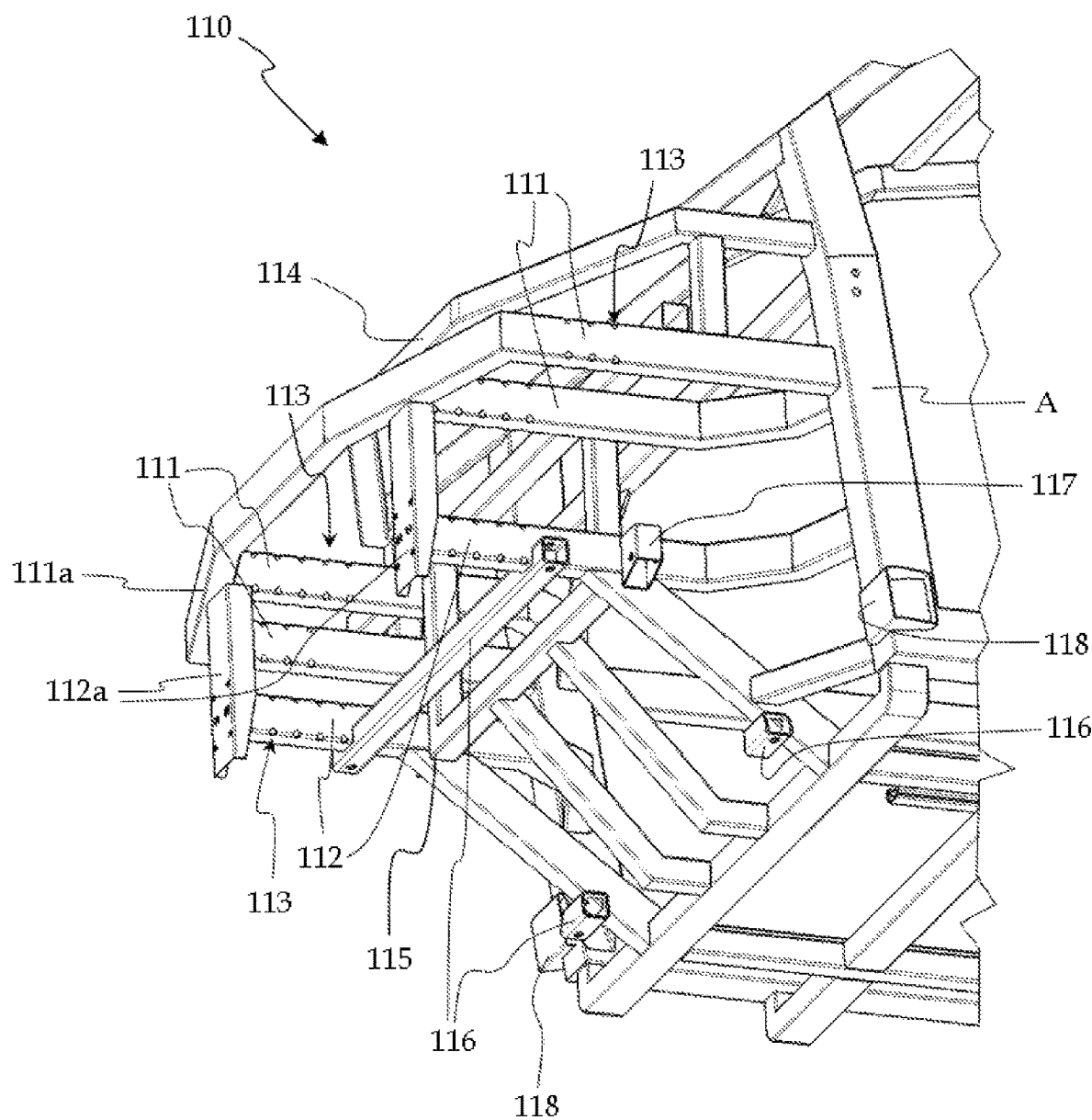
FIG. 7 is a perspective view of a front sub-unit of the main frame of the car according to the present invention.

FIG. 7 is a perspective view of a front sub-unit (designated as a whole as 110 in FIG. 7) of the main frame 10 of the car 1 according to the present invention.

With particular reference to FIGS. 2 and 7, the main frame 10 comprises a front sub-unit 110 having two front side pillars A connected to a reticular lattice structure. Protruding from the latter, four first longitudinal struts 111 for impact energy absorption are arranged at a first upper level and are distributed transversally over the width of the main frame 10, and two second longitudinal struts 112, also intended for impact energy absorption, are arranged at a second lower level, symmetrically on both sides of the longitudinal median plane of the car 1.

All the longitudinal struts 111, 112 constitute as many "crash-boxes" intended to collapse after a front collision in order to absorb the shock energy.

Preferably, each one of said longitudinal struts 111, 112 is made from a boxed element 60 conceived in accordance with the provisions of the present invention, and comprises notches (designated as a whole by reference numeral 113 in FIGS. 2 and 7), which allow the longitudinal struts 111, 112 to collapse following a front impact, so as to absorb the shock energy.

Preferably, said notches 113 are made on the edges of the boxed element 60 that forms said longitudinal struts 111, 112; also, said notches 113 preferably have a substantially circular shape. It is clear that said notches 113 may also be provided on the sides of the longitudinal struts 111, 112 and have conformations other than substantially circular.

The two first longitudinal struts 111 closer to the median plane of the car are vertically aligned with the second longitudinal struts 112.

The front ends of the first longitudinal struts 111 in the upper position are connected to a crossmember 111a, intended to distribute the impact force upon said first longitudinal struts 111.

The two second struts 112 in the lower position have their front ends connected to respective plates 112a intended to be connected to a crossmember (not shown) wholly similar to the crossmember 111a, or to a crossmember integrated into a front bumper (not shown) of the car 1.

In their upper part, the front side pillars A are connected to a crossmember 114 under the windshield, which acts as a bottom edge for supporting a windshield of the car 1.

It is therefore apparent that the front sub-unit 110 of the main frame 10 of the car 1 according to the present invention has very good lightness and strength properties and is also highly capable of absorbing impact energy, which places the car 1 one step ahead of any other car of the same category manufactured so far. In fact, in the event of a collision the longitudinal struts 111, 112 provide energy absorption through progressive and controlled deformation, in particular due to the provision of the notches 113.

It is thus plain that the car 1 according to the present invention offers, in the event of a collision, strength and passenger safety characteristics that significantly exceed those normally attainable from cars of the same category made from pressed or bent sheet-steel or conventional steel tubes.

It must also be pointed out that the front sub-unit 110 of the main frame 10 may additionally comprise:
- a tubular structure 115, in particular "U" shaped, for supporting a pedal unit (not shown);
- at least one first bracket 116 for attaching the front axle unit 20;
- at least one second bracket 117 for attaching the suspension unit 50;
- a pair of wheel stopping plates 118 for front collisions, each wheel stopping plate 118 being associated with a respective front side pillar A.

Figure 8A:
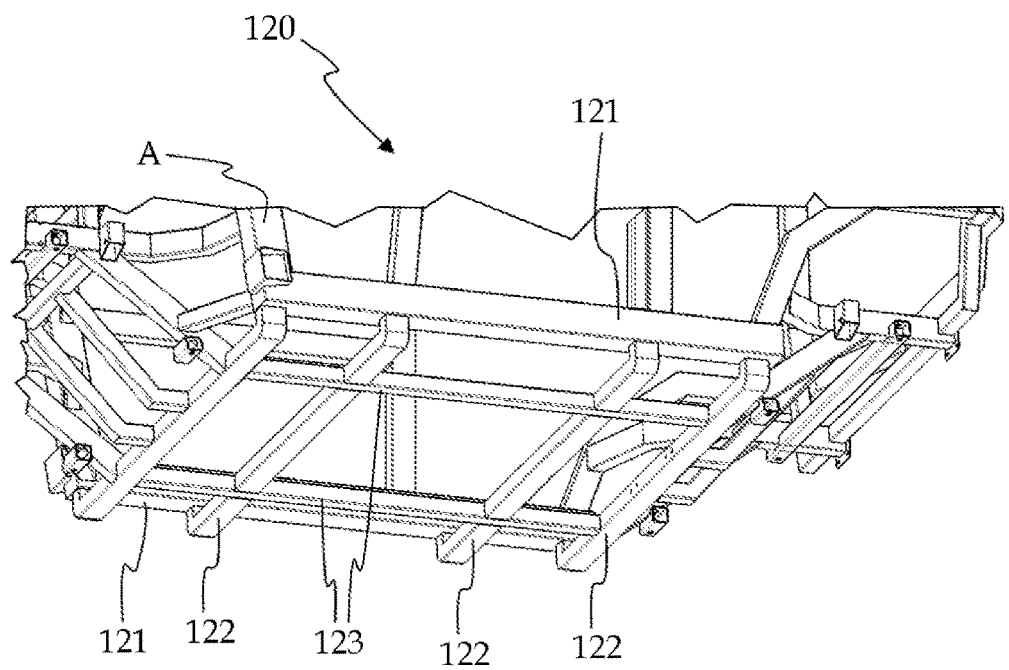
FIGS. 8*a* and 8*b* are different perspective views of a floor sub-unit of the main frame of the car according to the present invention.
Figure 8B:
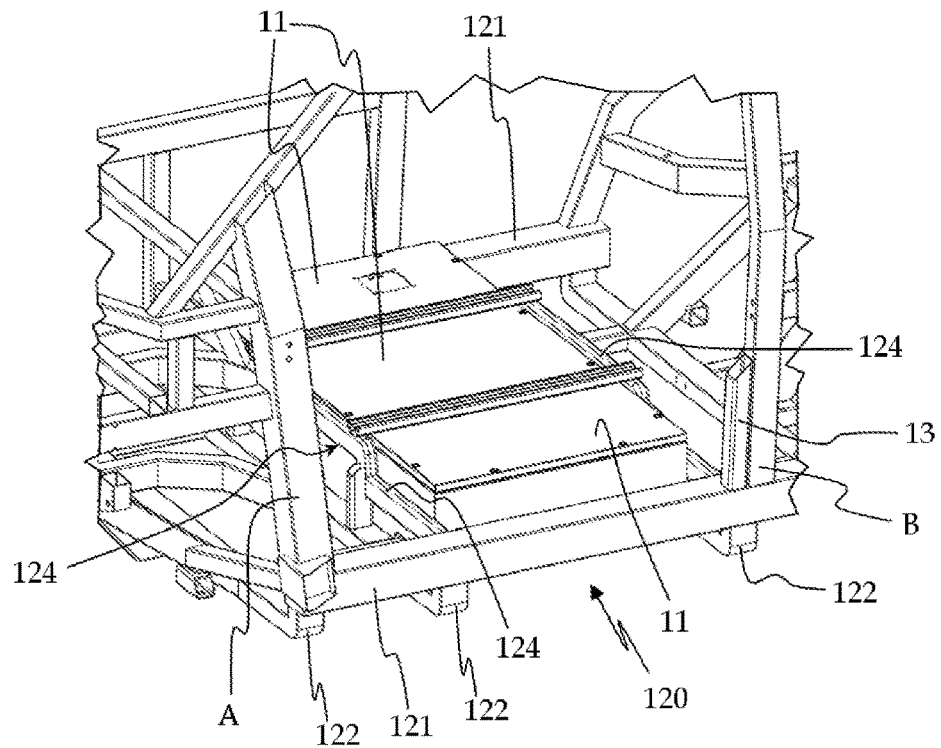

With reference to FIGS. 2, 8a and 8b, it can be noticed that the main frame 10 comprises a floor sub-unit (designated as a whole by reference numeral 120 in FIGS. 8a and 8b) consisting of a reticular lattice structure that comprises:
- two main side members 121,
- a plurality of crossmembers 122 that connect said main side members 121,
- additional side members 123 extending longitudinally between said main side members 121 in order to connect said cross-members 122 to each other,
- wherein said reticular lattice structure constitutes a support structure for supporting at least one electric battery 11 for supplying power to at least one electric motor M aboard the car 1.

It should be noted that the structure of the side members 121, 123 and of the crossmembers 122 is obtained by means of boxed elements 60 in accordance with the present invention.

The front ends of said main side members 121 are connected to the front side pillars A; furthermore, the intermediate side pillars (the so-called B pillars) are connected to said main side members 121; as a result, the floor sub-unit 120 is essentially delimited at the front by the front side pillars A and at the rear by the intermediate side pillars B.

Preferably, the B pillar on the left-hand side is longitudinally in a rearwardly displaced position relative to the B pillar on the right-hand side, so as to allow the formation of a single, large front door opening on the left-hand side and a single, large rear door opening on the right-hand side. As a consequence, as aforementioned, due to this provision both the front door PA and the rear door can have a relatively long dimension in the longitudinal direction, compared with the total longitudinal dimension of the car 1, which allows easy access to both the front driver seat and the rear seats despite the very small longitudinal dimension of the car 1. On the right-hand side, a smaller door can be mounted in front, for the purpose of providing a way out should the car 1 overturn. This solution is also particularly advantageous when the car 1 is intended for use as a taxi, since in such cases the passenger very seldom sits in the front seat. It is however clear that a reversed configuration may be adopted as well, with the front door on the right-hand side and the rear door on the left-hand side.

It must be pointed out that the main frame 10 comprises at least one small pillar 12 (visible in FIG. 8b) fixed, in particular welded, to at least one main side member 121, and at least one intermediate side pillar B for stopping the door in the event of a side collision and contributing to strengthening said intermediate side pillar B.

Figure 9:
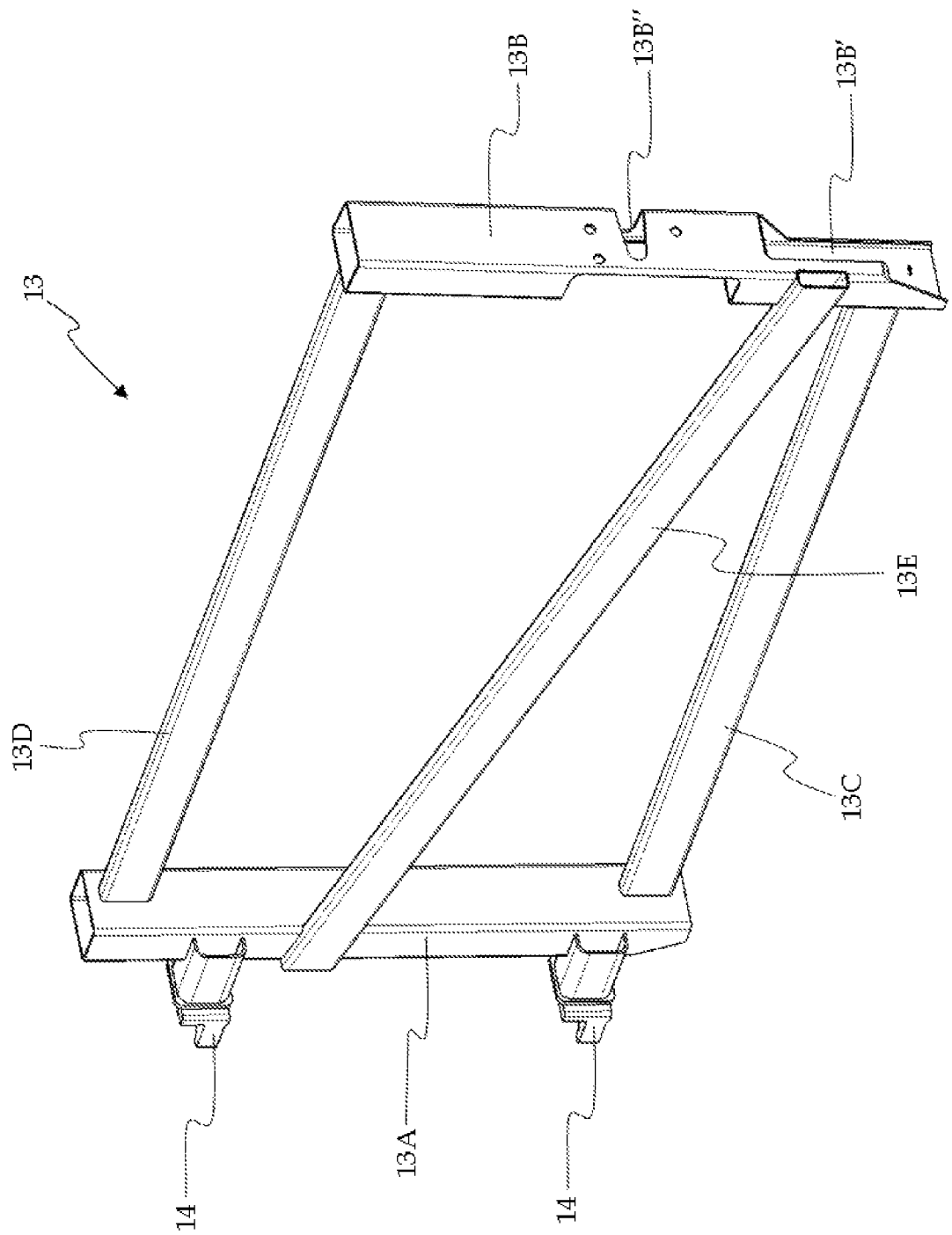
FIG. 9 is a perspective view of a door structure of the main frame of the car according to the present invention.

FIG. 9 is a perspective view of a door structure (designated as a whole by reference numeral 13) of the main frame 10 of the car 1 according to the present invention.

Said door structure 13 is made up of boxed elements 60 conceived in accordance with the provisions of the present invention, and comprises:
- a front pillar 13A, to which hinges 14 are secured for articulating the door structure 13 relative to the front side pillar A (when the door structure 13 is mounted on the left-hand side of the car 1) or relative to the intermediate side pillar B (when the door structure 13 is mounted on the right-hand side of the car 1),
- a rear pillar 13B,
- a lower longitudinal bar 13C and an upper longitudinal bar 13D adapted to connect the front pillar 13A and the rear pillar 13B,
- at least one anti-intrusion bar 13E positioned between said longitudinal bars 13C, 13D and adapted to connect the front pillar 13A and the rear pillar 13B.

Furthermore, when the door structure 13 is mounted on the left-hand side of the car 1 (as in the case shown in FIG. 9):
- the lower portion of the rear pillar 13B comprises a recess 13B' shaped in such a way as to abut against the small pillar 12 fixed to the intermediate side pillar B;
- the rear pillar 13B comprises a seat 13B" adapted to receive, at least partially, the components of a lock (not shown).

Referring back to FIGS. 2 and 8, it can be noticed that the floor sub-unit 120 comprises also a seat supporting structure (designated as a whole by reference numeral 124 in FIG. 8b), in particular of the reticular lattice type, which defines a support plane for a driver seat (not shown), in particular said support plane being raised and adapted to define, in co-operation with the side members 121, 123 and said crossmembers 122, a compartment for housing said at least one electric battery 11.

The seat supporting structure 124 also performs the function of limiting the deformations caused by a side collision, in order to protect said at least one electric battery 11 and, of course, the passengers.

The seat supporting structure 124 comprises at least one pair of bars 124A whereon the seat guides 124B are secured, in particular, said bars 124A performing the function of stiffening the seat guides 124B, which may also be directly screwed to said bars 124A.

It should be noted that the seat supporting structure 124 is removable, thus allowing installation, maintenance and removal of said at least one electric battery 11.

Still in FIG. 2, it can also be noticed that the floor sub-unit 120 may comprise brackets 125 for supporting any side airbags (not shown in the drawings), in particular said support brackets 125 being fixed to said bars 124A of the seat supporting structure 124 and to the main side members 121.

It is therefore clear that the particular arrangement of said at least one electric battery 11 in accordance with the teachings of the present invention ensures efficient and safe storage of one or more electric batteries 11 aboard the car 1.

Figure 10:
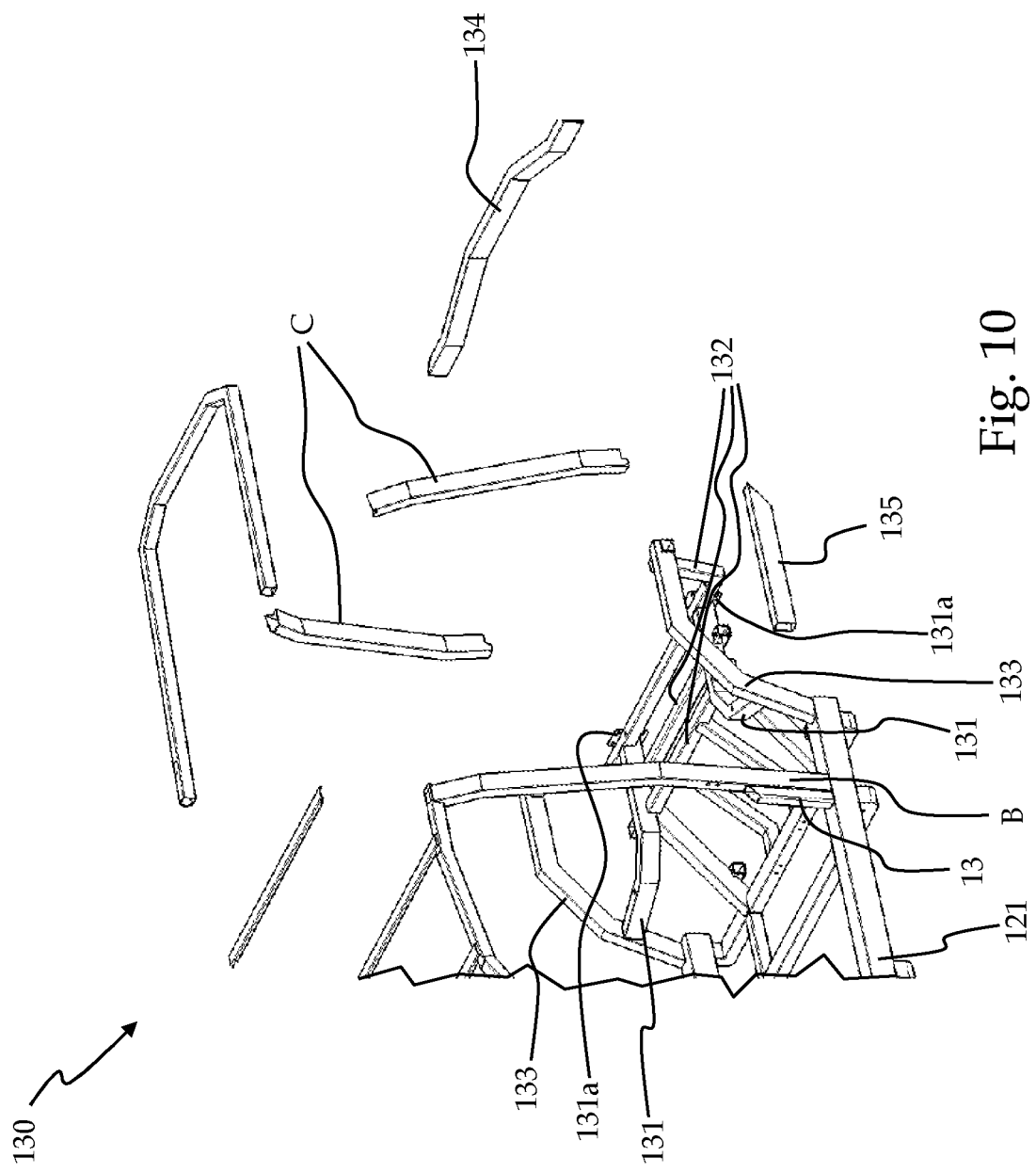
FIG. 10 is a perspective view of a rear sub-unit of the main frame of the car according to the present invention.
Figure 11:
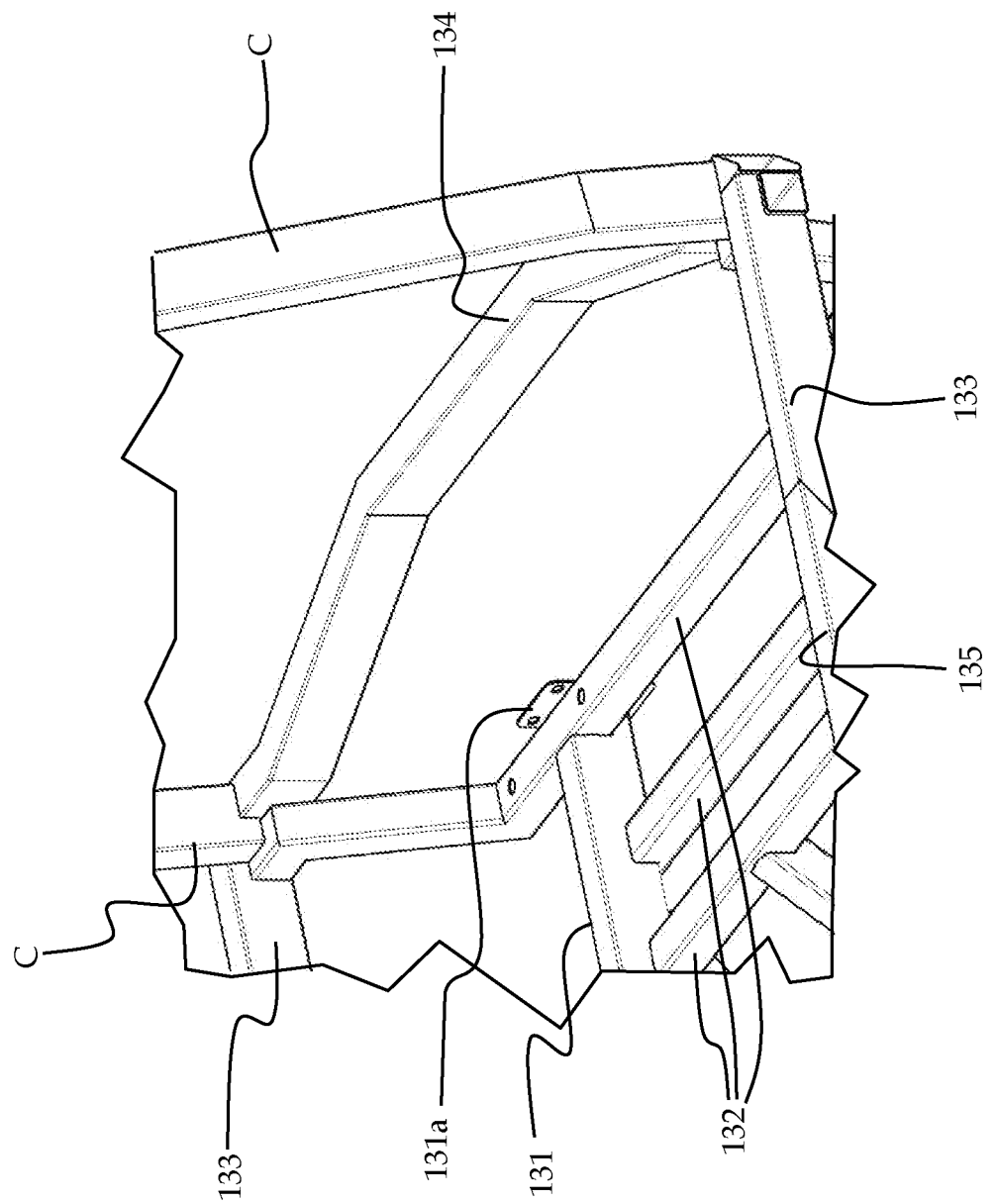
FIG. 11 is a perspective view of a detail of the rear sub-unit of FIG. 10.

With reference to FIGS. 2, 10 and 11, it can be observed that the main frame 10 comprises a rear sub-unit (designated as a whole by reference numeral 130 in FIGS. 10 and 11) made up of boxed elements 60 conceived in accordance with the provisions of the present invention, and comprises a pair of rear struts 131 having their rear ends connected to respective rear plates 131a intended to be connected to a crossmember, which may be integrated into a rear bumper (not shown) of the car 1.

Preferably, as can be noticed by comparing FIG. 10 with FIG. 2, the pair of rear struts 131 has substantially the same conformation as that of the second struts 112 of the front sub-unit 110; moreover, the pair of rear struts 131 may be so realized as to comprise some notches (not shown in FIG. 10) allowing said rear struts 131 to collapse following a front or rear collision, so as to absorb the shock energy.

The rear sub-unit 130 comprises a plurality of rear crossmembers 132 connected to said rear struts 131 and defining a support plane for the rear seats (not shown in the drawings) of the car 1 according to the present invention.

It must be pointed out that, thanks to the previously described configuration of the rear axle unit 30, the support plane defined by the rear crossmembers 132 is relatively low and extends transversally for a considerable length, compared with the outer dimension of the car 1 according to the present invention.

The rear sub-unit 130 further comprises a pair of wheel arches 133 connected to the main side members 121 and to the rear crossmember 132 which is closest to the end of the rear struts 131, in particular said rear crossmember 132 being substantially U-shaped.

The rear sub-unit 130 may then comprise some elements that can be removed, in particular during the production or assembly stages, for creating different versions of the same car 1.

In particular, said elements may include one or more of the following elements:
- a rear crossbar 134;
- a pair of rear side pillars C (the so-called C pillars);
- a pair of side elements 135, in particular each side element 135 being adapted to be associated with a respective intermediate side pillar B and a respective wheel arch 133;
- a rear roof 136.

When all of the above-mentioned elements are present, possibly with the exception of the side element 135 on the right-hand side, the car 1 is of the type that can be used for passenger transport. When only the rear crossbar 134 and the right-hand and left-hand side elements 135 are present, the car 1 is of the type that can be used as a restaurant car, since it is suitable to house means for food preservation and cooking. When only the right-hand and left-hand side elements 135 are present, the car 1 is of the type that can be used as a "pick-up", suitable for freight transport. When only the rear crossbar 134 and the left-hand side element 135 are present, the car 1 is of the type that can be used as a "taxi".

Of course, the above-mentioned modifications and the different applications of the car 1 resulting therefrom are provided herein only by way of non-limiting example.

In FIGS. 10 and 11 it can also be observed (as already noted with reference to FIG. 6) that the terminal tract of a boxed element 60 may have a shape that is complementary to that of the terminal tract of another boxed element 60 and/or of another component of the car 1 to which it must be coupled.

By way of example, in FIGS. 10 and 11 it can be noticed that the connection of the rear side pillars C to the wheel arches 133 and the rear crossbar 134 that constitute the rear sub-unit 130 is effected by means of a joint between the ends of said elements, said ends being shaped by laser cutting.

Consequently, it is clear that such provisions allow forming the ends of each boxed element 60, in particular by laser cutting, in the most appropriate manner; it is thus possible to create joints between the various components, so as to obtain very strong junctions, particularly at the structural nodes of the main frame 10 and/or of the auxiliary frames 40.

The features and advantages of the car 1 according to the present invention, as well as those of the related manufacturing method, are apparent from the above description.

In particular, the special provisions of the present invention allow overcoming the problems suffered by the cars known in the art and by the production methods thereof.

In fact, the peculiar provisions concerning the boxed element 60 according to the present invention allow realizing a car 1 having a structural architecture that drastically simplifies the production processes and equipment, resulting in lower installation costs, so as to make even a small-scale production economically advantageous.

It should also be noted that such provisions allow realizing the main frame 10 and the auxiliary frames 40 by carrying out extremely simple steps in very short production times.

Furthermore, the provisions of the present invention allow attaining high production flexibility, since different versions or models of a car can be manufactured through simple and low-cost adaptations of the boxed elements 60 and also of the production fixtures, since it is sufficient to use laser cutting machines for producing the boxed elements 60 in accordance with the teachings of the present invention.

Another advantage of the car 1 according to the present invention is given by the fact that, in the event of a collision, the car 1 according to the present invention provides strength and passenger safety characteristics that significantly exceed those normally attainable from cars of the same category.

A further advantage of the car 1 according to the present invention is given by the fact that the B pillar on the left-hand side longitudinally positioned farther back than the B pillar on the right-hand side allows the formation of a single, large front door opening on the left-hand side and a single, large rear door opening on the right-hand side. As a result of this provision, both the front door PA and the rear door can have a relatively long dimension in the longitudinal direction, compared with the total longitudinal dimension of the car 1, thus allowing easy access to both the front driver seat and the rear seats in spite of the very short longitudinal dimension of the car 1.

Another advantage of the car 1 according to the present invention is given by the fact that the particular provisions of the floor sub-unit 120 allows positioning at least one electric battery 11 in such a way as to ensure sufficient and shock-proof storage space for one or more electric batteries 11 aboard the car 1.

A further advantage of the car 1 according to the present invention is given by the fact that the particular provisions of the rear sub-unit 130 make said car 1 very versatile, in that said rear sub-unit 130 comprises elements that can be removed, in particular during the production or assembly stages, in order to create different versions of the same car 1.

Yet another advantage of the car 1 according to the present invention is given by the fact that it is so designed that its wheel track can be easily changed, e.g., widened and/or lengthened, by replacing just a few elements of said main frame 10 and auxiliary frames 40.

The car 1 and the related manufacturing method described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to the above-described car and manufacturing method, but may be subject to many modifications, improvements or replacements of equivalent parts and elements without departing from the inventive idea, as clearly specified in the following claims.

The invention claimed is:

1. An electric-propulsion car, of the type comprising:
a main frame,
a front axle unit,
a rear axle unit,
wherein said axle units comprise each an auxiliary frame for supporting said axle units and two suspension units that connect two respective wheel supports to said supporting auxiliary frame,
wherein at least one of said axle units is a motorized axle with steering wheels (R) comprising, mounted on said auxiliary frame, an electric motor (M) for actuating the rotation of the wheels (R), a control unit (UC) for controlling said electric motor (M), a transmission unit (T) connecting the electric motor (M) to the wheels (R), and a steering device (ST) for steering the wheel supports, and
wherein each one of said main frame and auxiliary frames comprises a reticular lattice structure including boxed elements made of steel, each one of said main frame and auxiliary frames being adapted to be pre-assembled separately and then assembled together,
wherein said main frame and auxiliary frames comprise elements made up of multiple segments connected together and derived from the boxed elements,
wherein at least one of the boxed elements is made of high-tensile steel,
wherein said at least one boxed element comprises at least one notch formed on at least one side of said boxed element without involving an ulterior side of the boxed element, said notch being made on said at least one side at a point where said ulterior side of the boxed element has to be bent to obtain a configuration of the boxed element in a finished form.

2. The electric-propulsion car according to claim 1, wherein said at least one boxed element is made from dual-phase steel.

3. The electric-propulsion car according to claim 1, wherein said at least one boxed element comprises a first notch of the at least one notch having a substantially triangular shape and defining at least one first pair of surfaces facing each other on said at least one side of the boxed element for making a sharp bend on said ulterior side of the boxed element.

4. The electric-propulsion car according to claim 3, wherein said at least one boxed element comprises a second notch of the at least one notch having substantially an "X" shape and defining:
at least one second pair of surfaces facing each other on said at least one side of the boxed element, and
at least one third pair of radiused contact surfaces formed on a portion of said at least one side that faces towards said ulterior side of the boxed element,
wherein said second notch allows making a radiused bend on said ulterior side of said boxed element.

5. The electric-propulsion car according to claim 4, wherein the shaping of the boxed element is carried out by bending said ulterior side of said boxed element, in particular said bending being effected along hinge lines formed on said ulterior side at the first and second notches.

6. The electric-propulsion car according to claim 4, wherein the size of the angle at the vertex of each of said first and second notches is substantially equal to the angle of bending required for the boxed element.

7. The electric-propulsion car according to claim 4, wherein said first and second notches are made by subjecting the boxed element to laser cutting.

8. The electric-propulsion car according to claim 1, wherein the boxed element comprises positioning elements adapted to define a univocal coupling between said boxed element and another boxed element.

9. The electric-propulsion car according to claim 8, wherein said positioning elements comprise at least one seat adapted to receive a corresponding tang, in particular the seat and the tang being obtained by subjecting the boxed element to a laser cutting operation.

10. The electric-propulsion car according to claim 1, wherein the shape of a terminal tract of the boxed element is complementary to a portion of another boxed element to which it must be coupled.

11. The electric-propulsion car according to claim 1, wherein the main frame comprises a front sub-unit, a floor sub-unit and a rear sub-unit having a reticular lattice structure comprising at least one boxed element.

12. A method for manufacturing an electric-propulsion car of the type comprising:
a main frame,
a front axle unit,
a rear axle unit,
wherein said axle units comprise each an auxiliary frame for supporting said axle units and two suspension units that connect two respective wheel supports to said supporting auxiliary frame,
wherein at least one of said axle units is a motorized axle with steering wheels (R) comprising, mounted on said auxiliary frame, an electric motor (M) for actuating the rotation of the wheels (R), a control unit (UC) for controlling said electric motor (M), a transmission unit (T) for connecting the electric motor (M) to the wheels (R), and a steering device (ST) for steering the wheel supports, and
wherein each one of said main frame and auxiliary frames comprises a reticular lattice structure including boxed elements made of steel, each one of said main frame and auxiliary frames being adapted to be pre-assembled separately and then assembled together, said method comprising the following steps:
a) realizing said main frame and auxiliary frames in such a way that they comprise elements made up of multiple segments connected together and derived from the boxed elements, wherein at least one of the boxed elements is made of high-tensile steel;
b) realizing said at least one boxed element in such a way that it comprises at least one notch formed on at least one side of said boxed element without involving an ulterior side of the boxed element,
c) executing a step of bending said ulterior side of the boxed element in correspondence of said notch to obtain a configuration of the boxed element in a finished form.

13. The method according to claim 12, wherein said step a) is carried out by realizing said boxed element from dual-phase steel.

14. The method according to claim 12, wherein said step b) is carried out through a step b1) of realizing a first notch of the at least one notch having a triangular section by executing a laser cutting operation on at least one side of the boxed element, so as to define at least one first pair of surfaces facing each other on said at least one side of the boxed element, wherein said step b) comprises a step b2) of realizing a sharp bend on said ulterior side of said boxed element at said first notch.

15. The method according to claim 14, wherein said step b) is carried out through a step b3) of realizing a second notch of the at least one notch having substantially an "X" shape by executing a laser cutting operation on at least one side of the boxed element, so as to define:
at least one second pair of surfaces facing each other on said at least one side of the boxed element, and
at least one third pair of radiused contact surfaces formed on a portion of said at least one side that faces towards said ulterior side of the boxed element,
wherein said step b) comprises a step b4) of realizing a radiused bend on said ulterior side of said boxed element at said second notch.

16. The electric-propulsion car according to claim 2, wherein the dual-phase steel is at least one of the DP600 type, DP800 type, DP1000 type, or D1200 type.

17. The method according to claim 13, wherein the dual-phase steel is at least one of the DP600 type, DP800 type, DP1000 type, or D1200 type.

* * * * *